(12) United States Patent
DiDomizio et al.

(10) Patent No.: US 8,085,828 B2
(45) Date of Patent: Dec. 27, 2011

(54) PORTABLE LASER SOURCE

(75) Inventors: Richard A. DiDomizio, Hatfield, PA (US); Michael J. Pollack, Lansdale, PA (US); William A. Rollin, Hatboro, PA (US); Neal Edwin Wilson, Cumberland, MD (US); Craig A. Kesner, Keyser, WV (US); James Edward Phillips, Jr., La Vale, MD (US); Christopher Hollandsworth, Cumberland, MD (US); Brian J. Padovini, Cumberland, MD (US)

(73) Assignees: Pollack Laboratories, Inc., Colmar, PA (US); Alliant Techsystems Inc., Minneapolis, MN (US)

( * ) Notice: Subject to any disclaimer, the term of this patent is extended or adjusted under 35 U.S.C. 154(b) by 5 days.

(21) Appl. No.: 12/795,222

(22) Filed: Jun. 7, 2010

(65) Prior Publication Data

US 2011/0019711 A1    Jan. 27, 2011

Related U.S. Application Data

(60) Provisional application No. 61/185,430, filed on Jun. 9, 2009.

(51) Int. Cl.
*H01S 3/14* (2006.01)
*H01S 3/091* (2006.01)

(52) U.S. Cl. .......................................... 372/77; 372/39
(58) Field of Classification Search ................... 372/39, 372/77
See application file for complete search history.

(56) References Cited

U.S. PATENT DOCUMENTS

| 5,179,246 | A  | 1/1993 | Betts et al. |
|-----------|----|--------|--------------|
| 7,201,103 | B1 | 4/2007 | Englund      |
| 7,204,190 | B2 | 4/2007 | Englund      |

*Primary Examiner* — Armando Rodriguez
(74) *Attorney, Agent, or Firm* — Howson & Howson LLP

(57) ABSTRACT

A portable laser source includes a flash lamp assembly defining a hollow central channel, an elongate laser rod extending within the hollow channel for receiving a flash of light emitted by the surrounding flash lamp assembly, and a hermetically-sealed enclosure housing both the flash lamp assembly and the laser rod and including at least one optical transmission window for transmitting a laser beam emitted by the laser rod. Preferably, the flash lamp assembly is hermetically-sealed from the laser rod within the enclosure to maintain physical and electrical isolation of the laser rod from combustible and electrically conductive components of the flash lamp assembly. The combustible component of the flash lamp assembly can include Zr wool and an accelerant, or like materials for emitting a flash of light. The laser source can include a second window used to test the condition of the laser rod via application of an external test light to activate the laser rod within the sealed enclosure.

25 Claims, 4 Drawing Sheets

PORTABLE LASER SOURCE

CROSS-REFERENCE TO RELATED APPLICATION

This application claims the benefit under 35 USC §119(e) of U.S. Provisional Patent Application No. 61/185,430, filed Jun. 9, 2009.

BACKGROUND OF THE INVENTION

The present invention relates to a laser source, and more particularly, the present invention relates to a portable self-contained laser source having a laser rod and flash lamp housed within a hermetically-sealed compact enclosure.

By way of example, and not by way of limitation, a laser source can be used for igniting pyrotechnic devices, explosive charges, and the like. Of course, laser sources also have other applications involving laser focus energy needs. With respect to laser-based ignition systems, the laser beams produced by the laser source is used to ignite explosive materials. For instance, a portable laser source can be used to ignite pyrotechnic devices in connection with airborne ejection seats and canopies of aircraft. Such sources can also be used to ignite explosive charges for mining and down hole and subsea exploration as well as munitions activation for cannons and ballistic devices.

While known laser sources and laser-based ignition systems may function in an acceptable manner, there continues to be a need for an improved portable laser source that provides high power output despite its relatively-compact size (i.e., high power to volume ratio) and that is of a self-contained rugged design capable of tolerating harsh environments such as chemically corrosive atmospheres and liquids, high and low temperature extremes, vacuum and high pressures, and high levels of shock and vibration. Further, the laser source should have high reliability and should be capable of being fired via various means, such as via electrical power, mechanically via use of a piezoelectric crystal or battery/capacitor, and via percussion caps.

BRIEF SUMMARY OF THE INVENTION

The present invention relates to a portable laser source that includes a flash lamp assembly and an elongate laser rod. The flash lamp assembly has opposite ends and defines a hollow central channel extending longitudinally therethrough, and the laser rod extends within the hollow channel for being subject to a flash of light emitted by the surrounding flash lamp assembly. The laser source also includes a hermetically-sealed enclosure that houses both the flash lamp assembly and the laser rod and includes at least one optical transmission window through which a focused laser beam emitted by the laser rod can be transmitted to a location exterior of the hermetically-sealed enclosure. Preferably, the flash lamp assembly is hermetically-sealed from the laser rod within the enclosure to maintain physical and electrical isolation of the laser rod from combustible and electrically conductive components of the flash lamp assembly. The combustible components of the flash lamp assembly can include Zr wool and an accelerant or like combustible material. As an alternatively, the flash lamp assembly can use high output LEDS for generating a flash of light.

BRIEF DESCRIPTION OF THE DRAWINGS

The present invention should become apparent from the following description when taken in conjunction with the accompanying drawings, in which:

FIG. 9 is an exploded perspective view of the device of FIG. 4.

DETAILED DESCRIPTION OF THE INVENTION

First and second embodiments of laser sources, 10 and 12, according to the present invention are illustrated in FIGS. 1-3 and FIGS. 4-9, respectively. The laser sources 10 and 12 each provide a compact, portable, can-shaped laser source that includes an elongate laser rod 14 and a separate flash lamp assembly 16 contained within the same hermetically-sealed housing or enclosure 18. Accordingly, the laser sources, 10 and 12, can be used to generate a focused laser beam for any application requiring laser focus energy, such as, for providing part of an ignition system for pyrotechnic devices, explosive charges, and the like.

Figure 1:
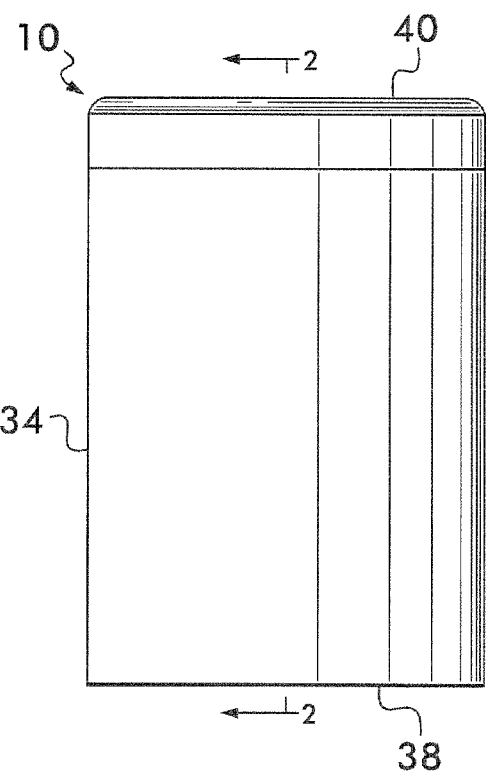
FIG. 1 is an elevational view of a first embodiment of a self-contained portable laser source according to the present invention.
Figure 2:
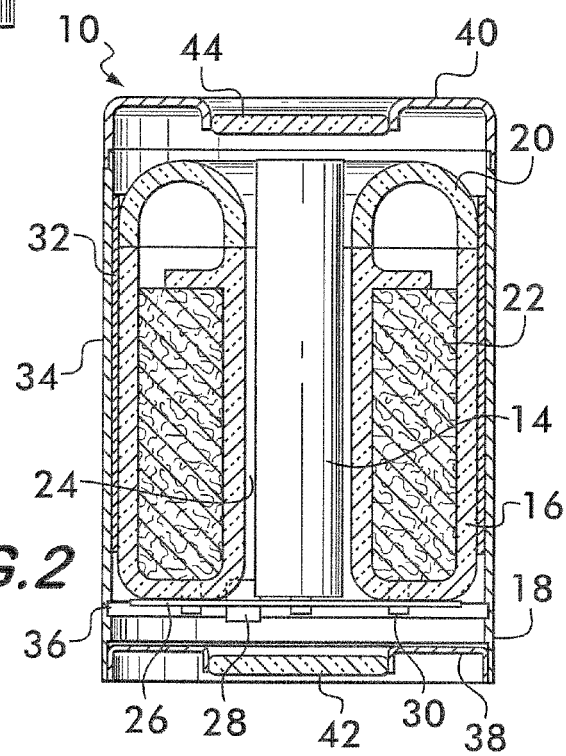
FIG. 2 is a cross-sectional view of the device of FIG. 1 along line 2-2.
Figure 3:
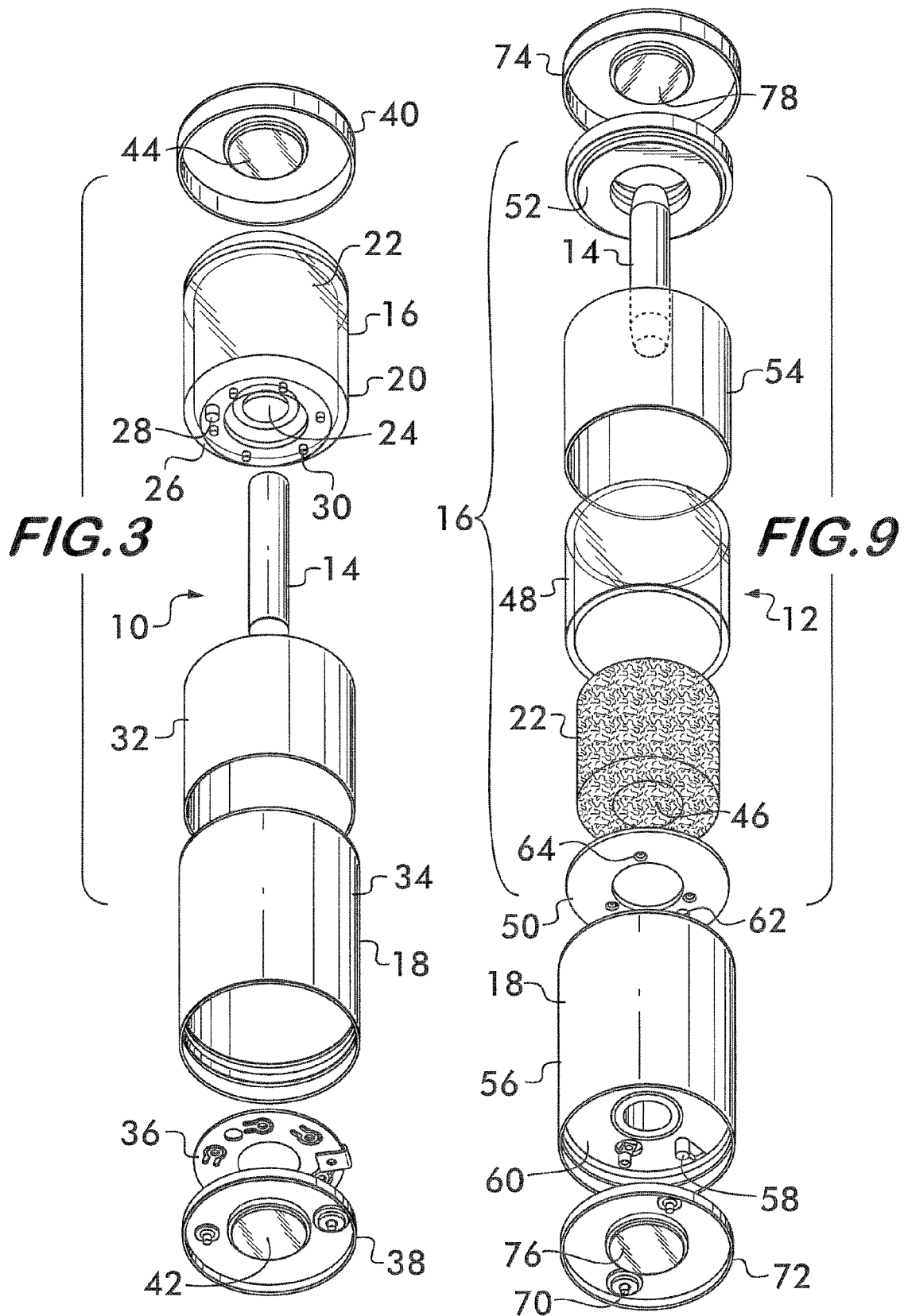
FIG. 3 is an exploded perspective view of the device of FIG. 1.
Figure 4:
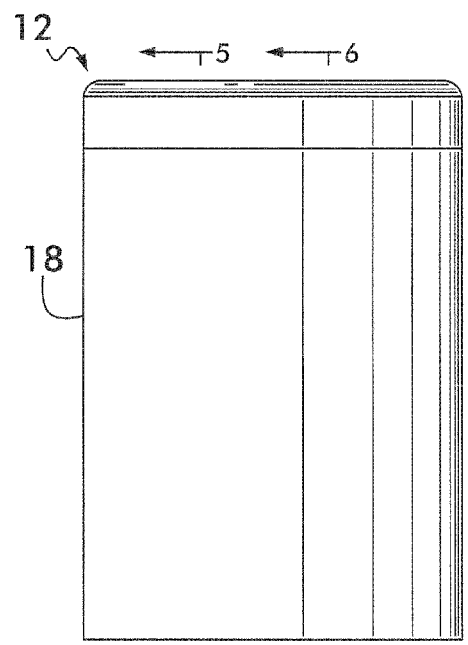
FIG. 4 is an elevational view of a second embodiment of a self-contained portable laser source according to the present invention.
Figure 5:
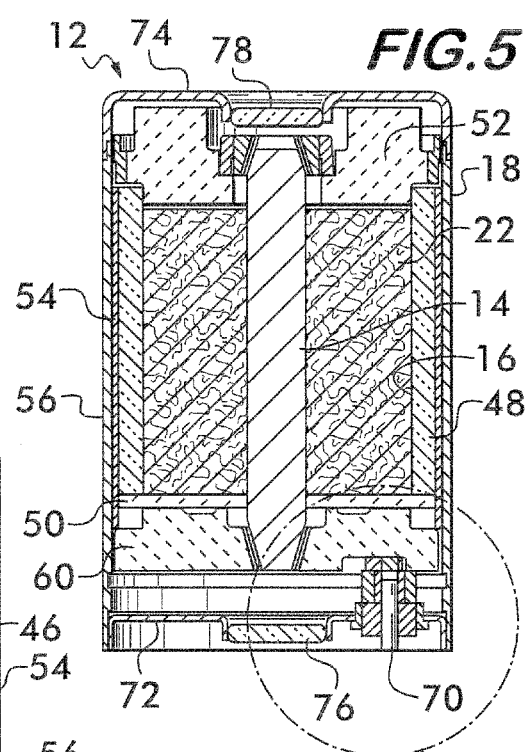
FIG. 5 is a cross-sectional view of the device of FIG. 4 along line 5-5.
Figure 6:
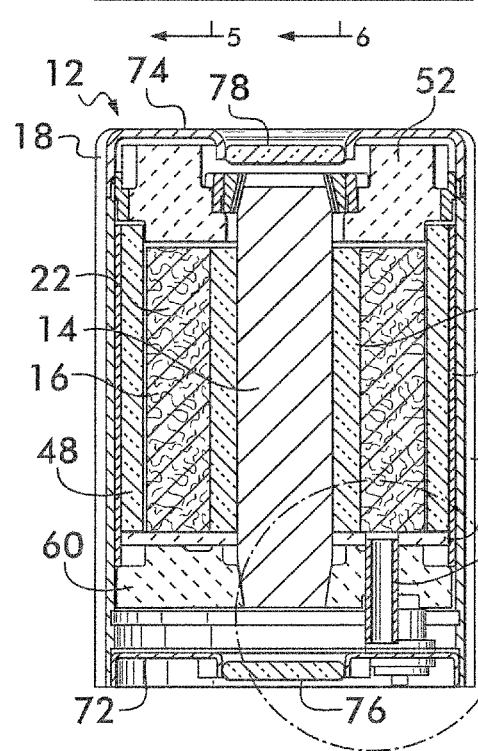
FIG. 6 is a cross-sectional view of the device of FIG. 4 along line 6-6.
Figure 7:
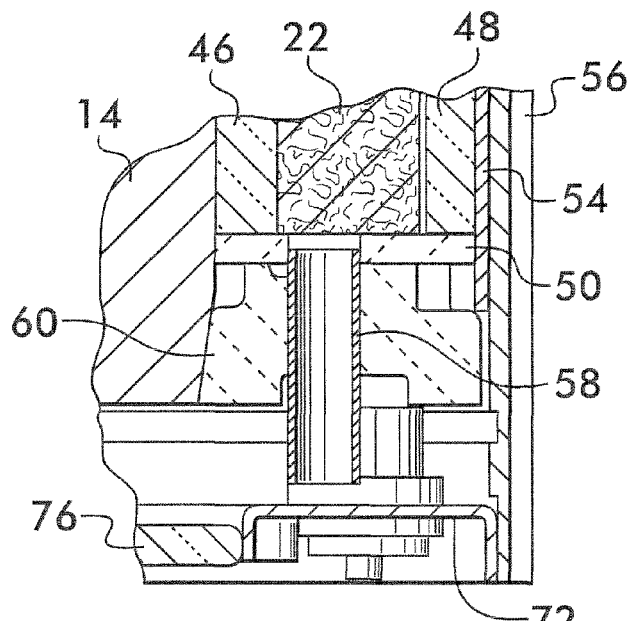
FIG. 7 is a magnified cross-sectional view of a fill tube of the device of FIG. 4.

The laser source 10 illustrated in FIGS. 1-3 has a flash lamp 16 provided by a sealed elongate cylindrical glass ampoule 20 containing a combustible material such as a zirconium (Zr) wool 22. The ampoule 20 defines an open central hollow channel 24 extending longitudinally therethrough and has an end 26 providing an evacuation/fill port 28 and a series of redundant electrical feed-through elements 30. A vacuum can be drawn within the ampoule 20 via the port 28, and thereafter, the ampoule 20 can be filled with an accelerant, such as liquid oxygen or the like, through port 28. The feed-through elements 30 are used to provide an electrical connection to the combustible material 22 for purposes of igniting or firing the fibers of the combustible material 22 to generate a flash of light.

The laser rod 14 is positioned within the channel 24 of the ampoule 20 as best illustrated in FIG. 2 such that it is surrounded 360° by the ampoule 20 and receives the flash of light from all angles. The ampoule 20 is located within a cylindrical reflective sleeve 32 that reflects light from the flash inwardly toward the laser rod 14. This assembly is received within a cylindrical side wall 34 that forms an exterior of the enclosure 18. A circuit board 36 or the like is mounted adjacent the end 26 of the ampoule 20 so that it is in contact with the electrical feed-through elements 30 for providing an electric signal or pulse thereto. Opposite input and output end covers, 38 and 40, form end walls of the enclosure 18 and are secured to the side wall 34 to create the hermetically-sealed enclosure 18.

The end covers 38 and 40 include optically clear transmission windows, 42 and 44, respectively, that form an integral part of the hermetic enclosure 18. A laser beam produced by the operation of the laser source 10 (i.e., when the Zr wool 22 is fired) is directed forwardly through the window 44 of the output end cover 38. In contrast, the window 42 in the input end cover 38 is used for purposes of applying a test light to the laser rod 14 to test the state, condition, and/or quality of the laser rod 14 sealed within the enclosure 18. In this manner, the laser rod 14 can be activated by the test light and the emitted laser beam can be monitored to determine the condition of the laser rod. Thus, a properly functioning laser source can be distinguished from one that no longer can be reliably used. This effectively lengthens the life of the laser source in the field since the laser source can be periodically tested in the field to monitor the condition of the laser rod and the laser rod does not have to be discarded simply based on the lapsing of a predetermined period of time. The input end cover 38 can also include a fill tube to draw a vacuum within the enclosure 18 and to fill the enclosure 18 in communication with the laser rod 14 with a desired inert gas, such as argon or the like.

The flash lamp 16 (i.e., Zr wool 22) of the laser source 10 is hermetically sealed via the sealed ampoule 20 from the laser rod 14 to maintain physical and electrical isolation of the laser rod 14 from the combustible and electrically conductive components of the flash lamp 16. The laser rod 14 includes a coating, for instance, neodymium ions, that will rapidly deteriorate in ambient air. Accordingly, the enclosure 18 is hermetically-sealed for at least the purpose or preventing deterioration of the laser rod coating. In addition, the enclosure 18 is designed to maintain the hermetic seal after the laser source 10 is fired so that gases produced within the laser source 10 remain contained within the enclosure 18.

A high voltage power source required to ignite the pyrotechnic (i.e. Zr wool 22) within the sealed ampoule 20 can be part of the same structure containing the laser rod 14 and flash lamp 16 or can be sealed in a separate and joining hermetically-sealed package. Alternatively, the power source can be located remotely outside of the harsh environment in which the laser source 10 is located and can be connected to the sealed laser source 10 via hermetically sealed electrical cables. One specific contemplated example of a power source is a piezoelectric crystal for use in creating piezoelectricity via the mechanical operation of providing pressure via a pin or like component. Activation of a piezoelectric crystal can produce about 10,000 volts DC which is sufficient to activate the flash lamp 16 of the laser source 10. An additional means for firing the wool 22 is via a percussion cap. The percussion cap can be located adjacent the laser source 10 and, when fired, can fracture the ampoule with sufficient force to cause the Zr wool 22 to fire and emit a flash of light. The percussion cap can be activated by a firing pin or the like.

The light source 10 is designed to be a single use ignition source. Thus, after its sole use, it is discarded. Some of the components may be recycled and/or reused, such as the laser rod 14, which tend to be made of expensive raw materials. However, it is also possible to design the laser source 10 such that it can be reused. For instance, utilizing a flash lamp comprising high output LEDs can make the laser source reusable.

Turning to the second embodiment of the present invention, FIGS. 5-9 illustrate a laser source 12. It is similar in most ways to the laser source 10; however, it is a design which better enables ready and cost efficient assembly.

The flash lamp source 16 of the laser source 12 includes a combustible material such as zirconium (Zr) wool 22 extending around the exterior of an inner hollow glass tube 46. This is inserted within an outer hollow glass tube 48. A ceramic insulator plate 50 and ceramic insulator body 52 are positioned at opposite ends of the glass tubes 46 and 48 to define a sealed cylindrical-shaped cavity for the fine Zr wool fibers 22. The outer hollow tube 48 is inserted within a cylindrical reflective sleeve 54 which is inserted within a cylindrical side wall 56 of the enclosure 18. The laser rod 14 is inserted within the inner glass tube 46 so that the laser rod 14 is positioned to receive the flash of light produced when the fine Zr wool 22 is fired and to receive light reflected by the reflective sleeve 54.

A fill tube 58 extends through the ceramic insulator plate 50 and an adjacent ring-shaped ceramic insulator body 60 and is in communication with the interior cavity containing the Zr wool 22. See FIG. 7. Gases are evacuated through the fill tube 58 to draw a vacuum between the inner and outer glass tubes 46 and 48, and then this area is filled via the fill tube 58 with an accelerant, such as liquid oxygen, for instance, at about 140 psi. Thereafter, the fill tube 58 is crimped closed to hermetically seal the Zr wool 22 within the enclosure 18 and to isolate the Zr wool 22 from the laser rod 14.

Preferably, the fill port 58 extends through a hole in the ceramic insulator plate 50 and thereby enables ready assembly and prevents rotation of the ceramic insulator plate 50 within the enclosure 18. Prevention of rotation of the ceramic insulator plate 50 is important because the ceramic insulator plate 50 includes a series (three as illustrated in FIG. 9) of ignition holes 64 which must be properly aligned with nickel/gold channels 66 formed in patterns on the face of the ceramic insulator body 60. This alignment is required to provide the necessary electrical connection to ignite/fire the Zr wool 22.

Figure 8:
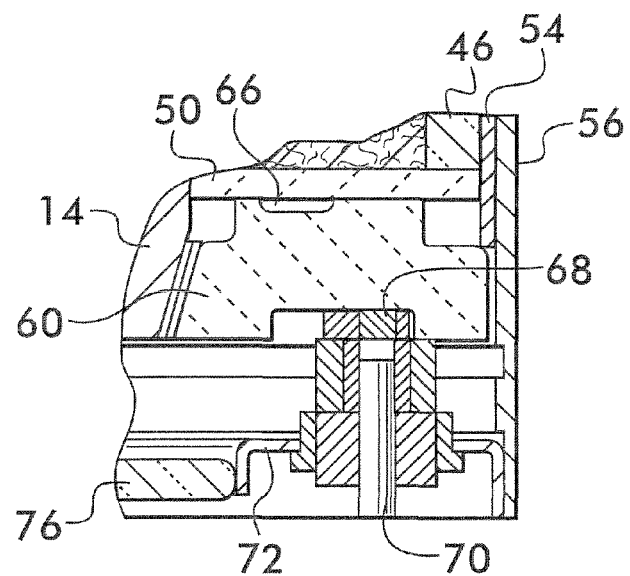
FIG. 8 is a magnified cross-sectional view of an ignition pin of the device of FIG. 4.

In the embodiment illustrated in FIG. 8, a high voltage power source used to ignite the Zr wool 22 within the enclosure 18 is a piezoelectric crystal 68 that is mechanically actuated by a push pin 70. The pressure exerted on the piezoelectric crystal 68 by pressing the pin 70 causes the piezoelectric crystal 68 to generate about 10,000 volts DC which is sufficient to activate the flash lamp 16 of the laser source 12. Of course, other types of power sources and arrangement of power sources can be utilized, such a percussion caps or the like.

The assembly of the laser source 12 also includes opposite input and output end covers 72 and 74 that form end walls of the enclosure 18. The end covers, 72 and 74, are secured to the side wall 56 to create a hermetically-sealed enclosure 18. The end covers 72 and 74 include optically clear transmission windows, 76 and 78, respectively, that form an integral part of the hermetic enclosure 18. The window 76 in the input end cover 72 is used for testing purposes, as described above, to apply a test light to the laser rod 14 to test the current state of the laser rod 14 within the enclosure 18. The laser beam produced via normal operation of the laser source 12 is directed through the window 78 of the output end cover 74. The input end cover 72 also includes the pin 70 used to initiate firing of the flash lamp 16 (i.e. Zr wool 22) and a fill tube to draw a vacuum in the area of the enclosure communicating with the laser rod 14 and to fill this area with an inert gas, such as argon.

Accordingly, the laser source of the present invention is portable, singular and modular and provides high power output despite its relatively-compact size (i.e., high power to volume ratio). The laser source is self-contained and is of a rugged design capable of tolerating harsh environments such as chemically corrosive atmospheres and liquids, high and low temperature extremes, vacuum and high pressures, and high levels of shock and vibration. Further, the laser source provides high reliability and is capable of being fired via direct electrical power, via mechanical actuation with use of a piezoelectric crystal, battery, capacitor, or the like, or via a percussion cap. The laser source has various applications including those requiring laser focus energy. The laser source can be used to detonate an explosive charge or pyrotechnic device. Alternatively, it can be used for other purposes, for instance, its output window can communicate with an external light rod or fiber optic cable to deliver laser energy to a remote location.

While a pair of portable laser source devices has been described in detail, various modifications, alterations, and changes may be made without departing from the spirit and scope of the present invention as defined in the appended claims.

The invention claimed is:

1. A portable laser source, comprising:
   a flash lamp assembly having opposite ends and defining a hollow central channel extending longitudinally therethrough between said opposite ends;
   an elongate laser rod extending within said hollow channel and surrounded by said flash lamp assembly for being subject to a flash of light emitted by said flash lamp assembly; and
   a hermetically-sealed enclosure housing both said flash lamp assembly and said laser rod and including at least one optical transmission window through which a laser beam can be transmitted;
   said flash lamp assembly being hermetically-sealed from said laser rod within said enclosure to maintain physical and electrical isolation of said laser rod from said flash lamp assembly.

2. A portable laser source according to claim 1, wherein said flash lamp assembly includes combustible material for generating said flash of light, and wherein said enclosure maintains physical and electrical isolation of said laser rod from said combustible material and electrically conductive components of said flash lamp assembly.

3. A portable laser source according to claim 2, wherein said combustible material of said flash lamp assembly includes Zr wool.

4. A portable laser source according to claim 2, wherein said combustible material of said flash lamp assembly is contained within a sealed glass ampoule defining said hollow central channel and having an end with at least one electrical feed-through to provide an electrical connection between said combustible material and a power source for firing said combustible material to generate said flash of light.

5. A portable laser source according to claim 2, wherein said combustible material is contained within separate inner and outer cylindrical glass tubes that have ends sealed closed by opposite insulating plates.

6. A portable laser source according to claim 5, wherein said insulating plates are ceramic plates.

7. A portable laser source according to claim 2, wherein said flash lamp assembly includes a fill tube for evacuating gas from a space containing said combustible material of said flash lamp assembly and for filling said space with an accelerant.

8. A portable laser source according to claim 7, wherein said accelerant is liquid oxygen.

9. A portable laser source according to claim 7, wherein a cylindrical light reflective sleeve extends about said combustible material to reflect light emitted by said combustible material toward said laser rod.

10. A portable laser source according to claim 9, wherein a piezoelectric crystal carried by said enclosure is used to generate sufficient voltage to fire said combustible material of said flash lamp assembly.

11. A portable laser source according to claim 10, wherein said enclosure is substantially cylindrical and has opposite closed ends, wherein each of said closed ends includes an optical transmission window, wherein one of said windows is for applying a test light to said laser rod.

12. A portable laser source according to claim 11, wherein a pin extends through one of said closed ends of said enclosure for pressing said piezoelectric crystal.

13. A portable laser source for igniting a pyrotechnic device, comprising:
    a flash lamp assembly including a sealed, substantially-cylindrical, elongate glass ampoule containing a combustible material and an accelerant, said ampoule having opposite ends and defining a hollow central channel extending longitudinally therethrough;
    an elongate laser rod positioned within said hollow channel for being subject to a flash of light emitted by firing said combustible material; and
    a hermetically-sealed, substantially cylindrical enclosure housing said flash lamp assembly and said laser rod and including at least one optical transmission window through which a laser beam emitted from said laser rod is transmitted from said enclosure;
    said combustible material being hermetically-sealed from said laser rod within said enclosure to maintain physical and electrical isolation of said laser rod from combustible and electrically conductive components of said flash lamp assembly.

14. A portable laser source according to claim 13, wherein said combustible material is Zr wool and said accelerant is liquid oxygen.

15. A portable laser source according to claim 13, further comprising a circuit board contained within said enclosure and exterior of said ampoule and having an electrical connection to electrical feed-through elements extending into said ampoule.

16. A portable laser source according to claim 15, wherein said ampoule is located within a cylindrical light reflective sleeve that reflect lights emitted by said combustible material toward said laser rod.

17. A portable laser source according to claim 16, wherein said enclosure includes opposite ends each having an optical transmission window, and wherein one of said windows is for applying a test light to said laser rod.

18. A portable laser source for igniting a pyrotechnic device, comprising:
    a flash lamp assembly including a cavity formed by separate inner and outer glass tubes and ceramic insulating plates at opposite ends thereof and defining a hollow central channel extending longitudinally therethrough and a combustible material contained within said cavity for producing a flash of light when fired;
    an elongate laser rod extending within said hollow channel for being subject to said flash of light emitted by said flash lamp assembly; and
    a hermetically-sealed enclosure housing both said flash lamp assembly and said laser rod and including at least one optical transmission window through which a laser beam emitted by said laser rod is transmitted;
    said combustible material being hermetically-sealed from said laser rod within said enclosure to maintain physical and electrical isolation of said laser rod from combustible and electrically conductive components of said flash lamp assembly.

19. A portable laser source according to claim 18, wherein said combustible material is a fibrous wool material and wherein said cavity also contains an accelerant.

20. A portable laser source according to claim 18, wherein said fibrous wool material is Zr wool and said accelerant is liquid oxygen.

21. A portable laser source according to claim 19, wherein said flash lamp assembly includes a fill tube for evacuating gas from said cavity and for filling said cavity with said accelerant.

22. A portable laser source according to claim 21, wherein a cylindrical light reflective sleeve extends about said outer glass tube to reflect light emitted by said wool toward said laser rod.

23. A portable laser source according to claim 22, wherein a piezoelectric crystal is carried by said enclosure and is used to generate a voltage sufficient to fire said wool material.

24. A portable laser source according to claim 23, wherein one of said ceramic insulating plates includes ignition apertures through which said wool material is ignited.

25. A portable laser source according to claim 23, wherein said enclosure has opposite closed ends, wherein each of said closed ends includes an optical transmission window, wherein one of said windows is for applying a test light to said laser rod, and wherein a pin extends through one of said closed ends of said enclosure for pressing said piezoelectric crystal.

* * * * *